United States Patent [19]

Pemberton

[11] Patent Number: 5,224,268
[45] Date of Patent: Jul. 6, 1993

[54] APPARATUS FOR SHEARING A MATERIAL MASS

[75] Inventor: Walter B. Pemberton, Fern Park, Fla.

[73] Assignee: Pemberton, Inc., Longwood, Fla.

[21] Appl. No.: 871,023

[22] Filed: Apr. 20, 1992

[51] Int. Cl.[5] .................. B25F 3/00; B26B 19/00; B26B 19/06
[52] U.S. Cl. ..................... 30/134; 30/194; 30/228
[58] Field of Search ............ 30/134, 228, 258, 173, 30/194; 83/609; 414/74

[56] References Cited

U.S. PATENT DOCUMENTS

| 4,198,747 | 4/1980 | LaBounty | 30/134 |
| 4,403,431 | 9/1983 | Ramun et al. | 37/117.5 |
| 4,519,135 | 5/1985 | LaBounty | 30/134 |
| 4,543,719 | 10/1985 | Pardoe | 30/134 |
| 4,558,515 | 12/1985 | LaBounty | 30/134 |
| 4,670,983 | 6/1987 | Ramun et al. | 30/134 |
| 4,686,767 | 8/1987 | Ramun et al. | 30/134 |
| 4,771,540 | 9/1988 | LaBounty | 30/228 |
| 4,776,093 | 10/1988 | Gross | 30/134 |
| 4,838,493 | 6/1989 | LaBounty | 241/101.7 |
| 4,897,921 | 2/1990 | Ramun | 30/228 |

Primary Examiner—Frank T. Yost
Assistant Examiner—Paul H. Heyrana, Sr.
Attorney, Agent, or Firm—James H. Beusse

[57] ABSTRACT

An apparatus for severing a material mass having a pair of movable shears. An outrigger is secured to the shearing and extended across the path of one of the movable shears. The outrigger supports the material mass when severed and transfers torque from one shear to urge it toward the other shear.

20 Claims, 4 Drawing Sheets

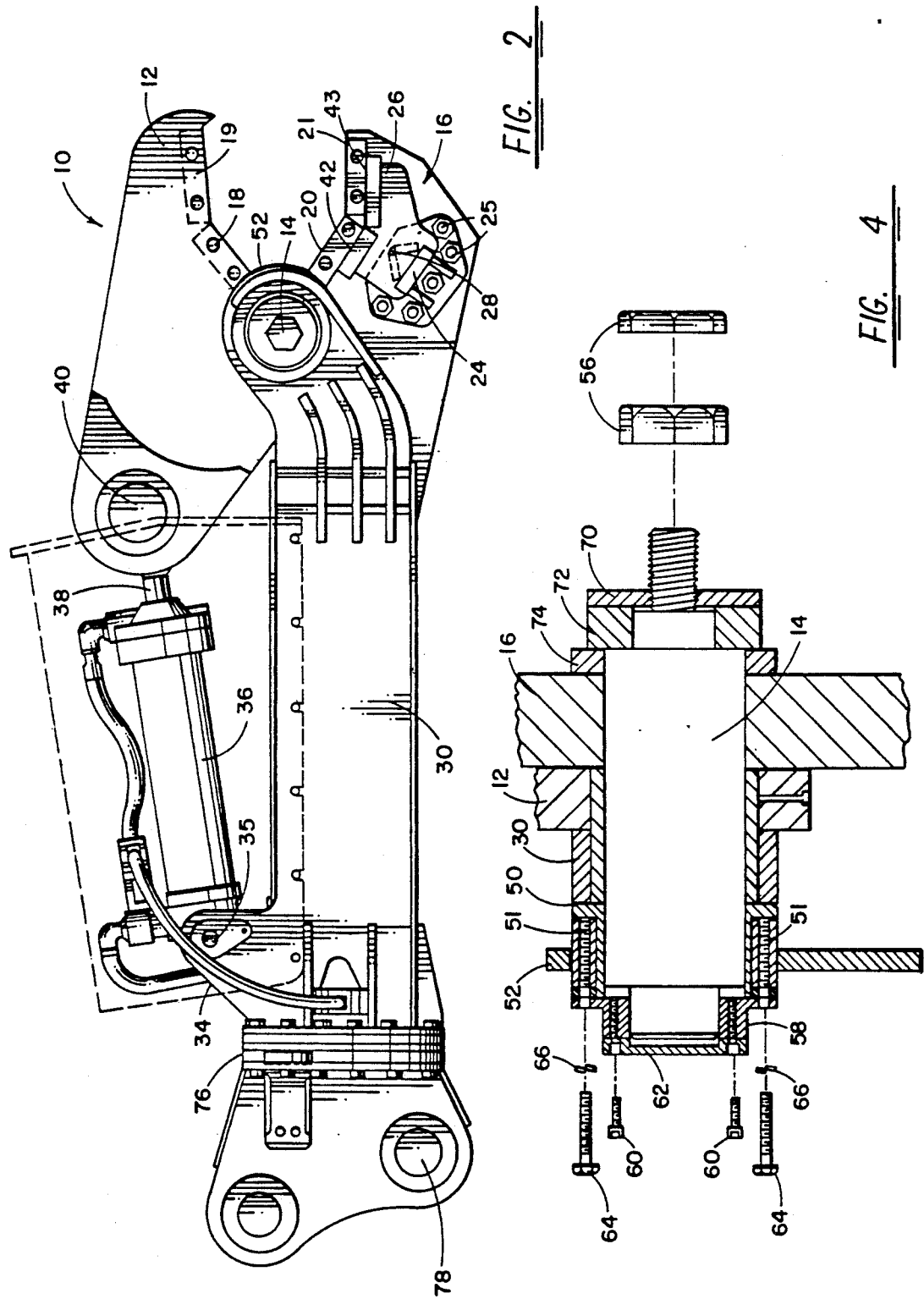

APPARATUS FOR SHEARING A MATERIAL MASS

BACKGROUND OF THE INVENTION

This invention relates to a shearing mechanism and more particularly to an apparatus for severing a material mass with a pair of shears rotating about a pivot.

Conventional shearing devices have a top and bottom shear or jaw each with cutting surfaces. At least one of the shears pivots about a transverse connecting pin and cuts the material placed in between the shears. Typically applications for these devices are for demolition to clear and reclaim rubble.

A drawback with many devices of this type is that when one shear is pivoted towards the second shear to cut the material, the shears tend to separate. This separation often results in warping rolling and/or breaking of one of the shears and the connecting pin, thereby limiting the material that can be crushed as well as the life expectancy of the shear.

Examples of shearing devices that have tried to alleviate shear separation are described in U.S. Pat. Nos. 4,543,719,; 4,558,515, and 4,776,093. These devices attempt to solve the problem associated with shears separating by providing a second parallel, non-cutting shear adjacent a first non-movable or fixed shear. The movable shear then crushes the material between the second non-cutting shear and the fixed shear. However, a drawback to these devices is that the material may often lodge in between the first shear and the second shear and must later be pushed out resulting in an interruption of the cutting operation. Further these shearing devices waste available cutting force because the force of the moving shear is directed into deforming or dragging the material mass against or through the non-cutting or second shear and the first non-movable shear.

SUMMARY OF THE INVENTION

An object of this invention is to provide an improved and more efficient shearing device.

Another object of this invention is to prevent shear separation and rolling of the jaws in a single shear head design.

It is a further object of this invention to increase shearing capability with fewer mechanical parts.

It is also an object of this invention to provide a single sided shear head that has a small frontal profile while preventing shear rolling.

A further object of this invention is to cut material with a shearing device without causing shears to separate and without lodging the material being cut between the shears.

It is a further object of this invention to shear with a device that concentrates available cutting force on the workpiece and not on adjacent cutting guides.

A further object of the invention is to provide a cutting shear that has an adjustable front profile so that the device may be used in tight areas to shear this material.

These and other objects are provided with an apparatus for severing a material mass having a pair of relatively movable shear means operable generally for at least in part severing the material mass. Each of the shearing means includes a surface defining a shearing edge and an outrigger secured to one end of the shearing means and extending across the path of the other of the shearing means for in part supporting the material means of at least during the severing operation of the shearing means. The supporting means establishes a material mass support by being arranged in preselect angularly spaced relations with the one of the shearing means. The material mass exerts a torque during the severing operation of the shearing means onto the material mass support. The support then transfers the torque to one shearing means to urge it towards the other of the shearing means. The shearing means combines with a support means to prevent separation of the shearing means from each other during operation. Preferably the material mass support is positioned at about a 22 degree angle below the top surface of the fixed shearing edge top surface to prevent the mass from being dragged across the shearing surfaces during the severing operation.

BRIEF DESCRIPTION OF THE DRAWINGS

FIG. 2 is a side view of the apparatus shown in FIG. 1;

FIG. 4 is a sectional view of pivot along line 4—4 of FIG. 1;

DESCRIPTION OF THE PREFERRED EMBODIMENT

Figure 1:
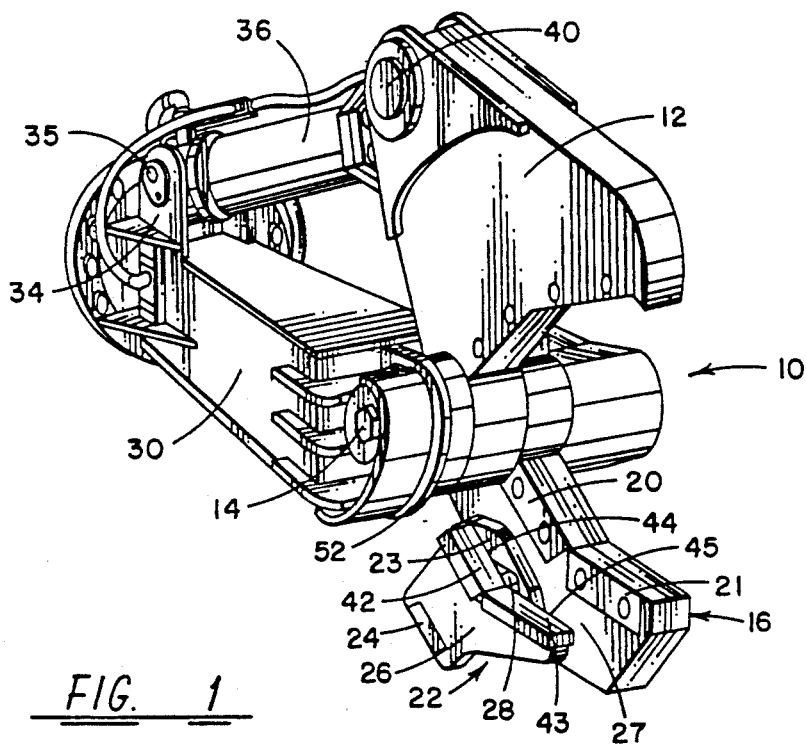
FIG. 1 is a front perspective view of the apparatus for severing a material mass.
Figure 3A:
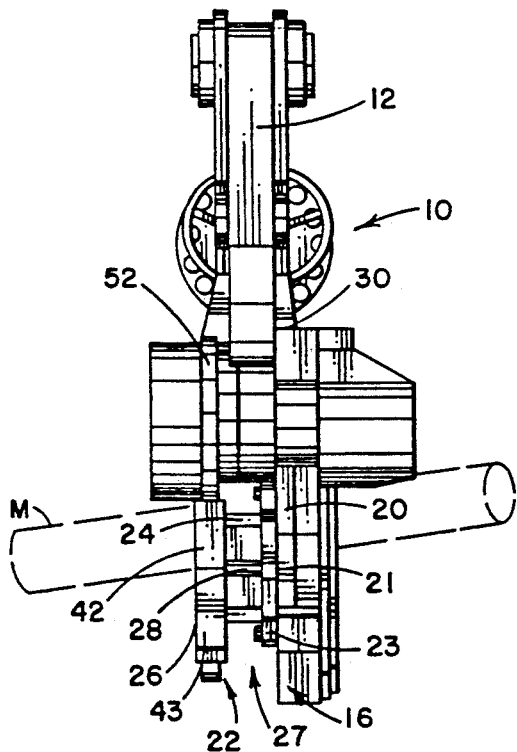
FIG. 3a is a front view of the apparatus shown in FIG. 2 with the shears in an open position.
Figure 3B:
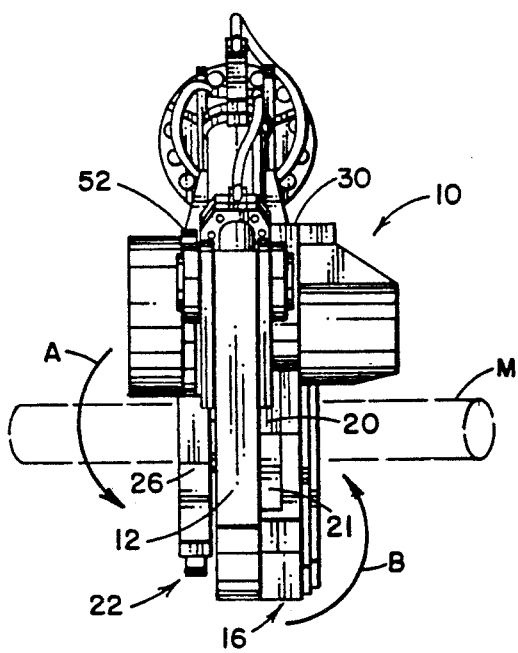
FIG. 3b is a front view of the apparatus with the shears in a closed position.

Referring to FIGS. 1-3, there is shown the apparatus for severing the material mass 10 having a movable shear 12 pivotally coupled on pin 14 to fix shear 16. In these Figures, movable shear 12 and fixed shear 16 are in a vertical orientation, and pin 14 is shown in a horizontal or transverse orientation. Shears 12 and 16 have a removable cutting or shearing edges 18,19 (FIG. 2) and 20,21 respectively, which pivot about pin 14 to sever a material mass M (FIGS. 3A and 3B). Edges 18 and 19, and edges 20 and 21 have a flat top surface and are disposed at a fixed angular relation to each other to form an apex that forces material mass into the apex when severed. Shearing edges 18–21 are preferably constructed with hardened steel and are removably connected to shears 12 and 16 by conventional techniques. Referring to FIGS. 1-3, and 8, outrigger 22 is shown in this orientation having a vertical support plate 26, horizontal or transverse support plate 24 and vertical mounting plate 23. Outrigger 22 supports the material mass during the severing operation of the shears. Removable shims 25 extend through mounting plate 23 to attach it to shear 16. Horizontal support plate 24 extends across a gap 27 between vertical support plate 26 and fixed shear 16 and across the path of travel of shearing means 12. Horizontal support plate 24 is welded at one end to vertical support plate 26 and at its other end to mounting plate 23.

Attached to the top surface of horizontal support plate 24 is discharge plate 28. Discharge plate 28 is shaped in an upside down V and extend across gap 27. The shape of discharge plate 28 assists portions of the material mass that are severed in being discharged below (See arrows in FIG. 8). It is recognized that this discharge plate 28 aids in preventing particles from being lodged between vertical support plate 26 and fixed shear 16.

During operation, shearing edge 18 pivots about pin 14 to sever material mass M placed between shearing edge 18 and shearing edge 20. Shear 12 after severing the material mass M extends into gap 27. Pivot pin 14 is supported by boom 30 which is coupled to a vehicle, such as a crawler 32 (see FIG. 5).

Coupled to flange 34 on one end of boom 30 with pin 35 is hydraulic cylinder 36. Extending out of the other end of hydraulic cylinder 36 from the flange 34 is piston 38 which attaches to pin 40 on movable shear 12. Hydraulic cylinder 36 is injected with hydraulic fluid to expand piston 38 outward. This outward expansion of piston 38 forces movable shear 12 to pivot about pin 14 to shear any material mass between shearing edges 18 and 20, and shearing edges 19 and 21.

Vertical support plate 26 has a flat supporting top surface 42 and 43 with top edges 44 and 45 respectively arranged in a predetermined angularly spaced relationship with respect to the top surface of shearing edge 20. When shears 12 and 16 are in a vertical plane, the preferred angle that the center of top surface 42 and 43 is below the top surface of the center of shear 16 is 22 degrees with respect the horizontal. Top edge 44 is preferably spaced below the top surface of shearing edge 20 less than the distance across gap 27. Exemplary dimensions for gap 27 is 3.5 inches, and for the level that the top surface 42 and 43 is below the top surface of fixed shear 16 is between about 1.5 and 2.0 inches. In general, the gap 27 is approximately the width of movable shear 12 plus about 0.5 inch.

Before the material mass is severed, support plate 26 supports the material mass (See FIG. 3A). Referring to FIG. 3B, when the mass is severed shear 12 pivots downward contacting the material mass M which in turn forces support plate 26 downward (See arrow A). In response to this downward force on support plate 26, torque is transferred from support plate 26 through horizontal support plate 24 which turns edges 20 and 21 of fixed shear 16 inward towards movable shear 12 (See arrow B). In addition, fixed shear 16 responds to forces from support plate 24 by being urged toward movable shear 12. It is recognized that pivot pin 14 and support plates 26 and 24 solely resist twisting of shears 12 and 16.

Outrigger 22 is removably coupled to fixed shear 16 with shims 25. Outrigger does not contact pin 14. Removing shims 25 permits outrigger 22 to be removed from fixed shear 16 to reduce the front profile of apparatus 10. Also subject to the 22 degree limitation already discussed, outrigger 22 may be replaced with an outrigger that has a different gap spacing to accommodate other material type being severed to prevent clogging of gap 27.

Referring to FIGS. 1 and 4, adjustable bushing 50 is disposed between movable shear 12 and pin 14. Fixed shear 16 is connected directly to pin 14. Adjustable bushing 51 surrounds pin 14 at the opposite end of pin 14 from fixed shear 16. Preferably a clearance of at least 0.015 inches is machined out of the inner walls of bushings 50 and 51, i.e., the inner bushing 50 has an overbore of several thousandths with respect to the diameter of pin 14 and bushing 51 has an overbore of several thousandths with respect to the outer diameter of bushing 50. When movable shear 12 is urged toward fixed shear 16, the bushing clearance permits movable shear 12 to flex towards fixed shear 16 while compensating for any tendencies of fixed shear 16 to flex outwardly away from movable shear 12.

Referring to FIGS. 1-4, plate 52, also referred to as a pin support bracket, is spaced apart from shears 12 and 16. Plate 52 at one end surrounds pin 14 and bushing 51. Plate 52 extends partially along boom 30 and at its other end is welded to boom 30 using conventional techniques. Between plate 52 and shear 12 is boom 30 which also surrounds bushing 50 and pin 14. Plate 52 prevents pivot pin 14 from warping during the severing operation.

Pin 14 is threaded at each of its ends. At one end of pin 14 are brackets 70-74. Screws 56 attach to pin 14 and when tightened on pin 14, brackets 70-74 hold fixed shear 16 in place. Bracket 58 is attached to the other end of pin 14 and can also be tightened. Bolts 60 screw through plate 62 into threads in bracket 58. Bolts 64 are held to bushing 51 with locknut 66 and are screwed through an aperture in bracket 58 and into bushing 51. Bolts 64 can be tightened to set the distance and tension between movable shear 12 and fixed shear 16 along pin 14. This adjustment of tension varies the torque transferred when one of the shears is urged toward the other of the shears.

Figures 5, 6:
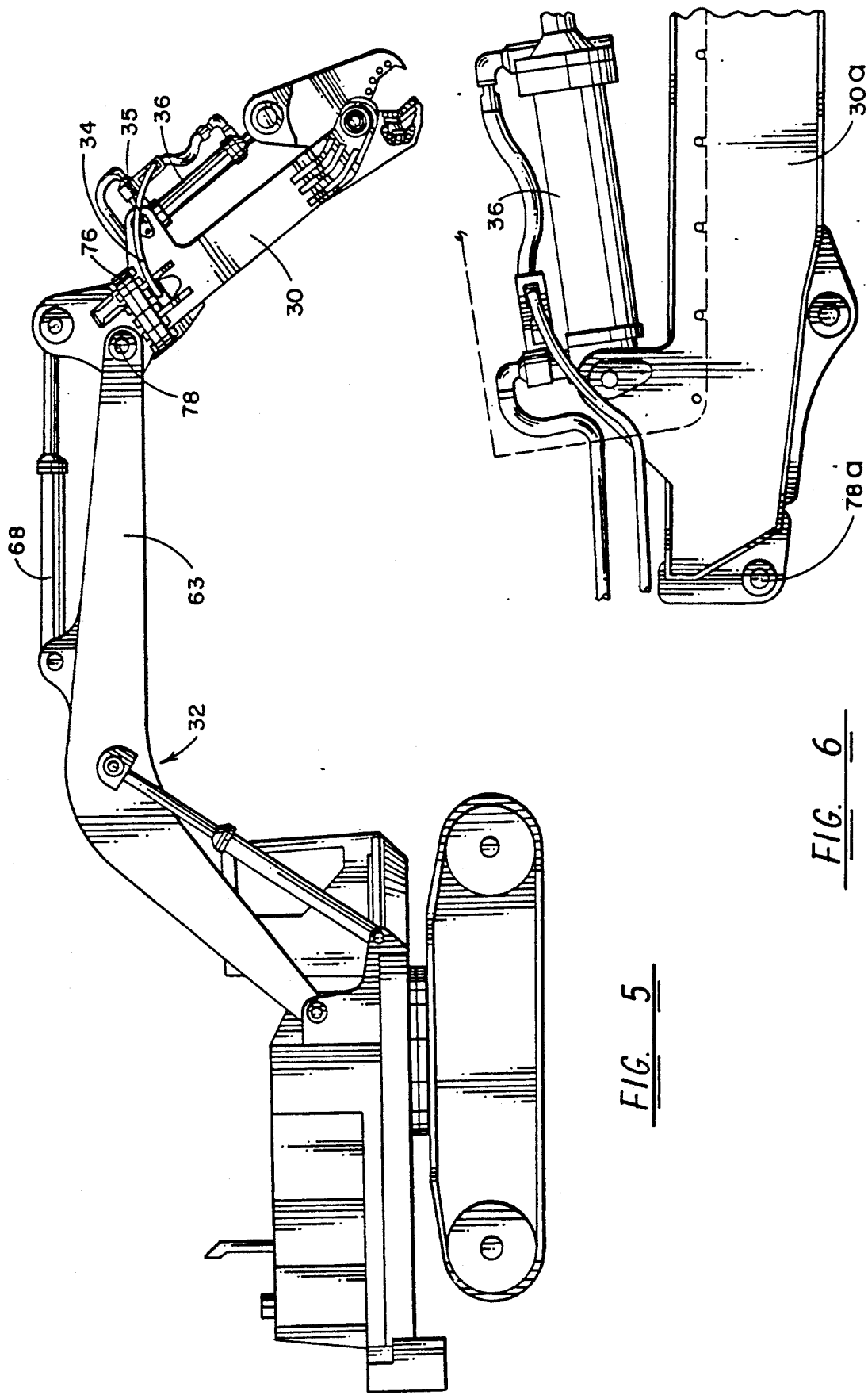
FIG. 5 is a side view of the apparatus for severing a material mass on an excavator and powered by the excavators bucket dig cylinder.
FIG. 6 is a side view of a cylinder in an alternate embodiment of a boom which supports the severing apparatus.

Referring to FIG. 5, there is shown the apparatus on an excavation truck or crawler 32. By conventional means, apparatus 10 may be pivotally connected to a beam 63 of crawler 32 so that its position may be adjusted with cylinder 68. The opening of shears 12 and 16 are adjusted with hydraulic cylinder 36 using the techniques previously described.

Referring to FIG. 5, boom 30 is mounted to crawler through turning device 76 which rotates shearing device 10 about an axis extending through device 76. Turning device 76 is mounted to crawler 32 with a pin extending through yolk 78.

Referring to FIG. 6, an alternate embodiment of boom 30a is shown. In this embodiment a pin extends through yolk 78a to mount boom 30a to crawler 32.

Figures 7, 8:
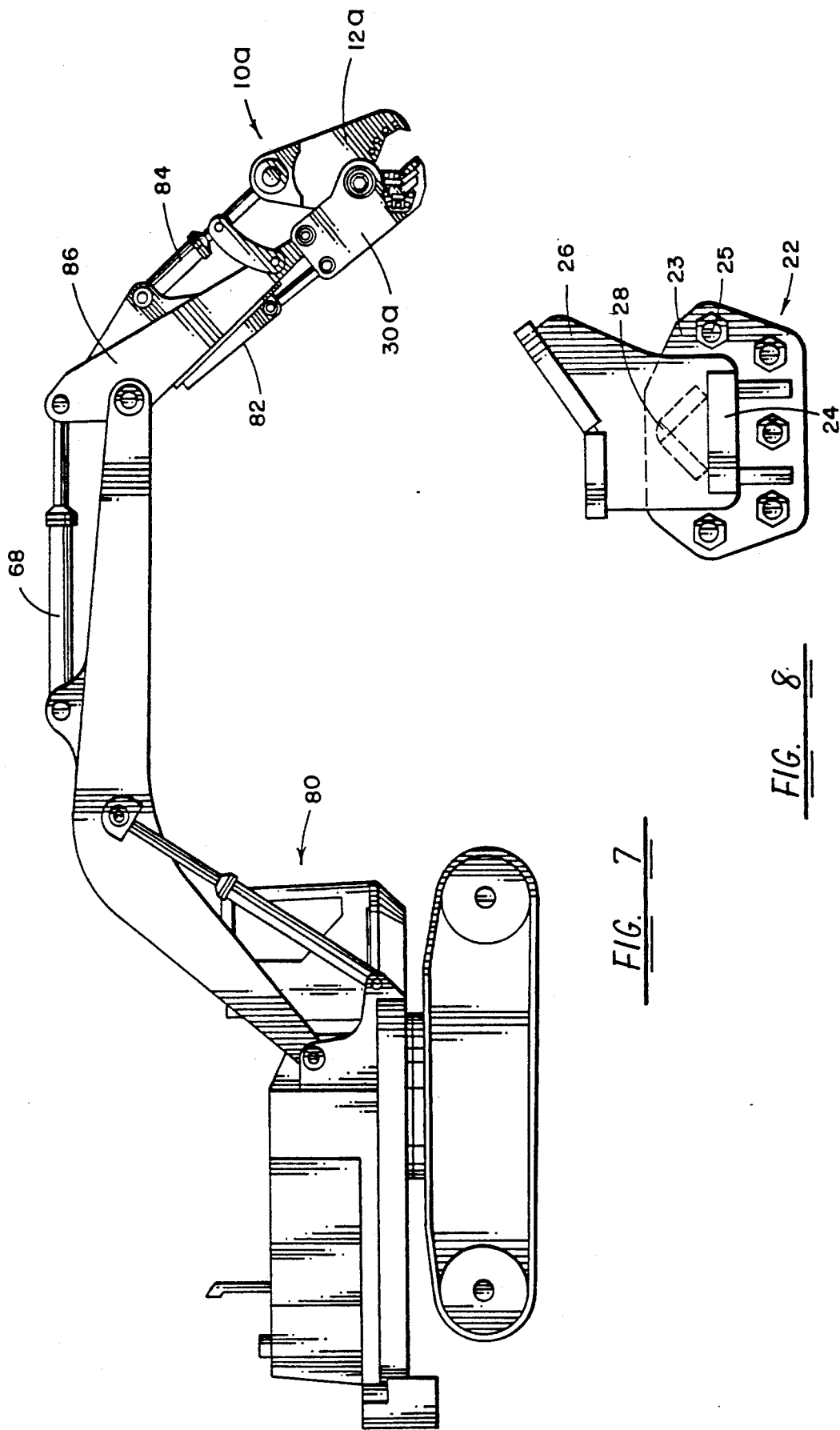
FIG. 7 is a side view of an alternate embodiment of the apparatus for severing a material mass mounted on a back hoe.
FIG. 8 is an enlarged view of the outrigger shown in FIG. 2.

Referring to FIG. 7, an alternate embodiment of the severing apparatus 10a is shown connected to back hoe 80. In this embodiment, boom 30a of apparatus 10a is mounted to a cylinder 82 of back hoe 80, and movable shear 12a is mounted to cylinder 84 of back hoe 80. In this embodiment the shearing apparatus 10a, functions with existing cylinders 68,82 and 84, and boom 86 of back hoe 80.

This concludes the description of the preferred embodiments. A reading by those skilled in the art will bring to mind various changes without departing from the spirit and scope of the invention. It is intended, however, that the invention only be limited by the following appended claims.

What is claimed is:

1. Apparatus for severing a material mass comprising:
 a pair of relatively movable shear means operable generally for at least in part severing the material mass, each shearing means including a surface defining a shearing edge;

supporting means secured only to one of said shearing means and extending across a path of travel of the other of said shearing means for in part supporting the material mass at least during the severing operation of said shearing means and establishing a material mass support arranged in preselected angularly spaced relation with said one of said shearing means, the material mass exerting a torque during the severing operation of said shearing means onto said material mass support and said supporting means transferring the torque to said one shearing means urging it towards said other shearing means.

2. The apparatus of claim 1 wherein said supporting means is removably secured to said one of said shearing means below said shearing edge thereof when said shearing means are oriented to shear in a generally vertical plane.

3. The apparatus in claim 1 wherein said other of said shearing means is pivotally coupled to said one of said shearing means by a pivot pin passing through each of said shearing means, and wherein relative twisting of said shearing means during operation thereof being resisted solely by said pivot pin and said supporting means.

4. The apparatus as recited in claim 3 further comprising a plate means connected to said pivot pin for preventing the pivot pin from warping during the severing operation.

5. The apparatus as recited in claim 1 wherein said material mass support and shearing means has a top edge and wherein the top edge of the mass support in about 22 degrees below the top edge of the shearing means.

6. The apparatus as recited in claim 1 further comprising means for adjusting the torque transferred when one of the shearing means is urged towards said other shearing means.

7. The apparatus as recited in claim 1 further comprising means for removably connecting said support means to said one said shearing means such that when the support means is removed the front profile of the apparatus is reduced.

8. The apparatus as recited in claim 1 wherein the gap between said supporting means and said one of said shearing means is selected to be narrow to prevent loose particles of the severed mass from being lodged in the gap.

9. The apparatus as recited in claim 1 further comprising means for permitting portions of said material mass to discharge between said support means and said one of said shearing means.

10. An apparatus for severing a material mass comprising:
a fixed shear having a surface defining a shearing edge;
a movable shear pivotally coupled to said fixed shear and operable to sever the material mass with the fixed shear;
an outrigger means secured to said fixed shear and extending across a path of travel of the movable shear for supporting a portion of the material mass during the severing operation of said shearing means, said outrigger means having a material mass supporting top surface arranged in a preselected angularly spaced relationship below the shearing edge upper surface, said preselected angle being selected to transfer torque from the material mass to said fixed shear to urge said fixed shear towards said movable shear when the material mass is severed; and
a vehicle means coupled to said shear and said outrigger means for transporting said shears.

11. The apparatus as recited in claim 10 wherein said top surface of said supporting surface is about 22 degrees below the surface of the fixed shear shearing edge top surface.

12. The apparatus as recited in claim 10 wherein said outrigger means includes means extending between said material means support and said fixed shear for permitting portions of said material mass to be discharged between said fixed shear and said support.

13. The apparatus as recited in claim 10 wherein said fixed shear movable shear and outrigger means are connected to a pivot with the fixed shear being positioned adjacent a first end of the pivot, the material mass support being positioned adjacent a second end of the pivot and the movable shear being placed therebetween.

14. The apparatus as recited in claim 13 further comprising a plate means connected to said pin adjacent the second end for preventing said pivot from warping during the severing operation.

15. The apparatus as recited in claim 14 further comprising a bushing connected between said pin means and said plate means, said bushing having a clearance between said pin means to allow said movable shear to flex toward the fixed shear while compensating for any tendencies of the fixed shear to flex outwardly away from the movable shear.

16. The apparatus as recited in claim 10 wherein said outrigger means comprises means for removably attaching said material mass support to said fixed shear.

17. Apparatus for severing a material mass and connected to an arm of a crawler, the apparatus comprising:
a beam connected to said crawler and attached to a pin at the extremity of the beam;
a fixed shear and a relatively movable shear pivotally mounted on the pin and operable generally for at least in part severing the material mass by pivoting said movable shear about said pin, each of said shears including a surface defining a shearing edge;
an outrigger secured to said fixed shear and having a transverse support plate extending across a path of travel of the movable shear, said outrigger in part supporting the material mass at least during the severing operation of said shears and having a supporting surface being arranged in preselected angularly spaced relation with said fixed shear top surface, the material mass exerting a torque during the severing operation of said shears onto said outrigger and said outrigger transferring the torque through said transverse support plate to said fixed shear to urge it towards the movable shear.

18. The apparatus as recited in claim 17 further comprising a support plate extending around said pin and extending along the beam, said plate operative to prevent the pivot pin from warping during the severing operation.

19. The apparatus as recited in claim 17 further comprising a plate coupled to said pin and operative to adjust the torque transferred to the fixed shear when the fixed shear is urged towards said movable shear.

20. The apparatus as recited in claim 17 wherein the preselected angle of the top surface of the support plate with respect to the top surface of the fixed shear is about 22 degrees.

* * * * *